(12) United States Patent
Yuki

(10) Patent No.: US 8,665,528 B2
(45) Date of Patent: Mar. 4, 2014

(54) ZOOM LENS AND IMAGE PICKUP APPARATUS HAVING THE SAME

(71) Applicant: Canon Kabushiki Kaisha, Tokyo (JP)

(72) Inventor: Akihiko Yuki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/705,488

(22) Filed: Dec. 5, 2012

(65) Prior Publication Data

US 2013/0162885 A1 Jun. 27, 2013

(30) Foreign Application Priority Data

Dec. 21, 2011 (JP) ................................ 2011-279588

(51) Int. Cl.
*G02B 15/14* (2006.01)

(52) U.S. Cl.
USPC ........... 359/680; 359/676; 359/682; 359/683; 359/684; 359/685; 359/686; 359/689; 359/716; 359/740; 359/781; 359/784

(58) Field of Classification Search
USPC ......... 359/676, 680, 682–686, 689, 716, 740, 359/781, 784
See application file for complete search history.

(56) References Cited

U.S. PATENT DOCUMENTS

| | | | |
|---|---|---|---|
| 7,023,623 B2 | 4/2006 | Miyatake et al. | |
| 7,042,650 B2 | 5/2006 | Hagimori et al. | |
| 7,212,349 B2 * | 5/2007 | Mitsuki | 359/682 |
| 7,522,350 B2 * | 4/2009 | Nanba | 359/680 |
| 7,619,834 B2 * | 11/2009 | Obu et al. | 359/689 |
| 8,004,772 B2 * | 8/2011 | Yoshitsugu et al. | 359/682 |
| 8,031,410 B2 | 10/2011 | Katakura | |
| 8,089,701 B2 * | 1/2012 | Yoshitsugu et al. | 359/682 |
| 8,223,438 B2 * | 7/2012 | Yoshitsugu et al. | 359/682 |
| 8,270,093 B2 * | 9/2012 | Yoshitsugu et al. | 359/682 |
| 8,270,094 B2 * | 9/2012 | Yoshitsugu et al. | 359/682 |
| 8,284,495 B2 * | 10/2012 | Yoshitsugu et al. | 359/682 |
| 2005/0068634 A1 | 3/2005 | Miyatake et al. | |
| 2010/0046086 A1 | 2/2010 | Katakura | |

FOREIGN PATENT DOCUMENTS

| | | |
|---|---|---|
| JP | 2004-318110 A | 11/2004 |
| JP | 2008-250332 A | 10/2008 |
| JP | 2010-049189 A | 3/2010 |
| JP | 2010-060894 A | 3/2010 |

* cited by examiner

*Primary Examiner* — Evelyn A. Lester
(74) *Attorney, Agent, or Firm* — Fitzpatrick, Cella, Harper & Scinto

(57) ABSTRACT

A zoom lens includes, in order from an object side to an image side, a first lens unit of a negative refractive power, a second lens unit of a positive refractive power, and a third lens unit of a positive refractive power, an interval between the first lens unit and the second lens unit and an interval between the second lens unit and the third lens unit being configured to change in zooming from a wide angle end to a telephoto end. The first lens unit includes, in order from the object side to the image side, a negative lens and a positive lens. The predetermined conditions are satisfied.

12 Claims, 11 Drawing Sheets

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same. The present invention is suitable for a video camera, digital camera, a TV camera, and a surveillance camera.

2. Description of the Related Art

A recent image pickup apparatus including an image sensor, such as a video camera and a digital camera, is required to have a compact size and a high performance. Hence, an image pickup optical system used for the image pickup apparatus is demanded for a high optical performance zoom lens that provides a wide angle of view, a high zooming ratio, and a compact overall system size. A negative lead type zoom lens in which a lens unit of a negative refractive power is arranged on the side closest to the object is known as a zoom lens that provides a wide angle of view and a compact overall system size.

It is easy for the negative lead type zoom lens to obtain a wide image pickup angle of view at the wide angle end, and to miniaturize the whole zoom lens because the lens unit of the negative refractive power on the side closest to the object has a compact configuration. Known negative lead type zoom lenses are a three-unit zoom lens and a four-unit zoom lens each of which includes, in order from the object side to the image side, a first lens unit of a negative refractive power, a second lens unit of a positive refractive power, and a third lens unit of a positive refractive power.

A three-unit zoom lens disclosed in each of U.S. Pat. No. 8,031,410, Japanese Patent Laid-Open No. 2010-060894, and U.S. Pat. No. 7,023,623 includes a first lens unit that includes a negative lens and a positive lens, a second lens unit that includes a positive lens, a cemented lens in which a positive lens and a negative lens are joined together, and a positive lens, and a third lens unit that includes a positive lens. U.S. Pat. No. 7,042,650 discloses a four-unit zoom lens as another negative lead type zoom lens which includes, in order from the object side to the image side, a first lens unit of a negative refractive power, a second lens unit of a positive refractive power, a third lens unit of a positive refractive power, and a fourth lens unit of a positive refractive power.

One method for realizing a zoom lens having a high resolving power is to correct an aberration in accordance with a sensitivity wavelength distribution (spectral sensitivity characteristic) of the image sensor. A signal detected by the image sensor is composed of red (R), green (G), and blue (B) signals. A general image sensor has a sensitivity wavelength distribution illustrated in FIG. 12 for each of the RGB signals, and particularly has a high sensitivity in the wavelength corresponding to the G signal band. It is thus important for a zoom lens having a high resolving power to properly correct the chromatic aberration in a wavelength range from the F-line (486.13 nm) to d-line (587.56 nm) corresponding to the wavelength of the G signal band in which the image sensor has a high sensitivity. In particular, the lateral chromatic aberration among the chromatic aberration remarkably affects the resolving power of the whole screen, and thus it is particularly important to properly correct the lateral chromatic aberration in the entire zooming range.

In the negative lead type three-unit or four-unit zoom lens, it is important to properly determine a configuration of each lens unit so as to realize a compact overall system size and a wide angle of view, to properly correct the lateral chromatic aberration, and to obtain high optical performance. For example, unless the first lens unit has a proper lens configuration or a proper material, such as an Abbe number and a partial dispersion ratio, of each lens, it is difficult to realize a compact overall system size and a wide angle of view, and to obtain high optical performance. This is not limited to the negative lead type three-unit or four-unit zoom lens but is true of the negative lead type zoom lens having more lens units.

SUMMARY OF THE INVENTION

The present invention provides a zoom lens and an image pickup apparatus having the same, which can provide a compact overall lens system and a high optical performance in an overall zooming range.

A zoom lens according to the present invention includes, in order from an object side to an image side, a first lens unit of a negative refractive power, a second lens unit of a positive refractive power, and a third lens unit of a positive refractive power. An interval between the first lens unit and the second lens unit and an interval between the second lens unit and the third lens unit are configured to change in zooming from a wide angle end to a telephoto end. The first lens unit includes, in order from the object side to the image side, a negative lens, and a positive lens. The following expressions are satisfied:

$$-0.6 < f1/fT < -0.1$$

$$-0.020 < (\theta g, F11 - \theta g, F12)/(vd11 - vd12) < -0.004$$

$$15 < vd11 - vd12 < 40$$

where vd11 is an Abbe number of a material of the negative lens, θg,F11 is a partial dispersion ratio of the material of the negative lens, vd12 is an Abbe number of a material of the positive lens, θg,F12 is a partial dispersion ratio of the material of the positive lens, f1 is a focal length of the first lens unit, and fT is a focal length of an entire zoom lens at the telephoto end.

Further features of the present invention will become apparent from the following description of exemplary embodiments with reference to the attached drawings.

DESCRIPTION OF THE EMBODIMENTS

A detailed description will now be given of embodiments of the present invention with reference to the accompanying drawings. A zoom lens of this embodiment includes, in order from an object side to an image side, a first lens unit of a negative refractive power, a second lens unit of a positive refractive power, and a third lens unit of a positive refractive power. In zooming from a wide angle end to a telephoto end, an interval between the first lens unit and the second lens unit and an interval between the second lens unit and the third lens unit are configured to change. A fourth lens unit having a positive refractive power can be arranged on the image side of the third lens unit. The fourth lens unit may be fixed or configured to move in zooming.

Figure 1:
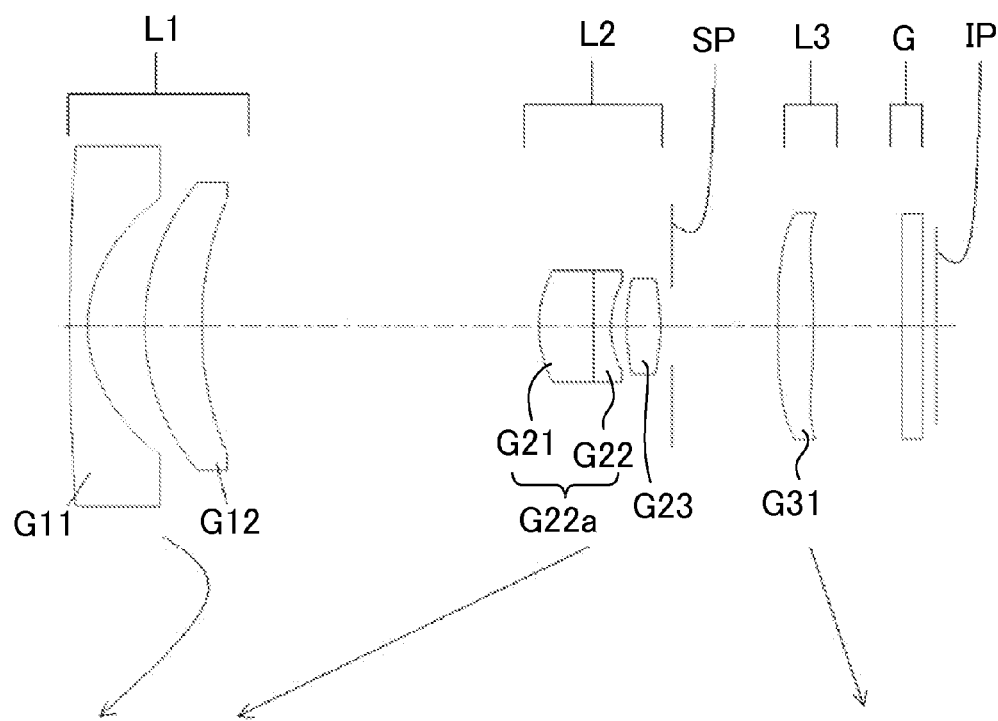
FIG. 1 is a lens sectional view at a wide angle end of the zoom lens according to a numerical example 1 (first embodiment) of the present invention.
Figure 2A:
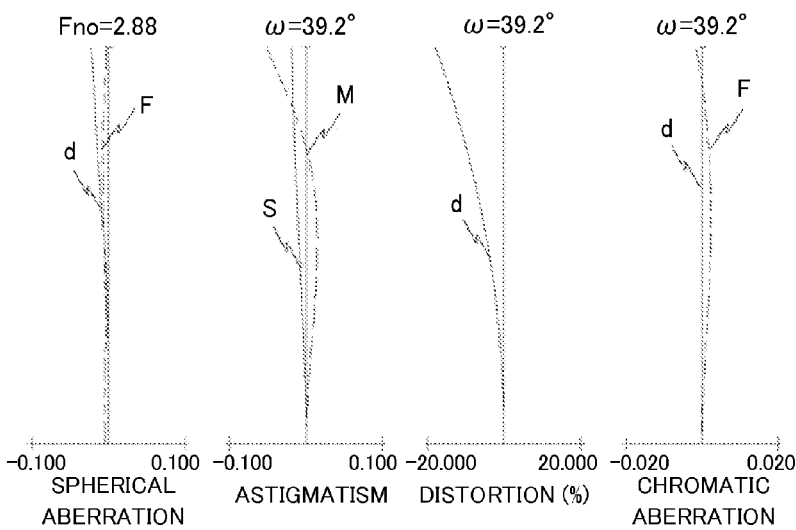
FIGS. 2A, 2B, and 2C are aberrational diagrams at a wide angle end, an intermediate zoom position, and a telephoto end of the zoom lens according to the numerical example 1 of the present invention.
Figure 2B:
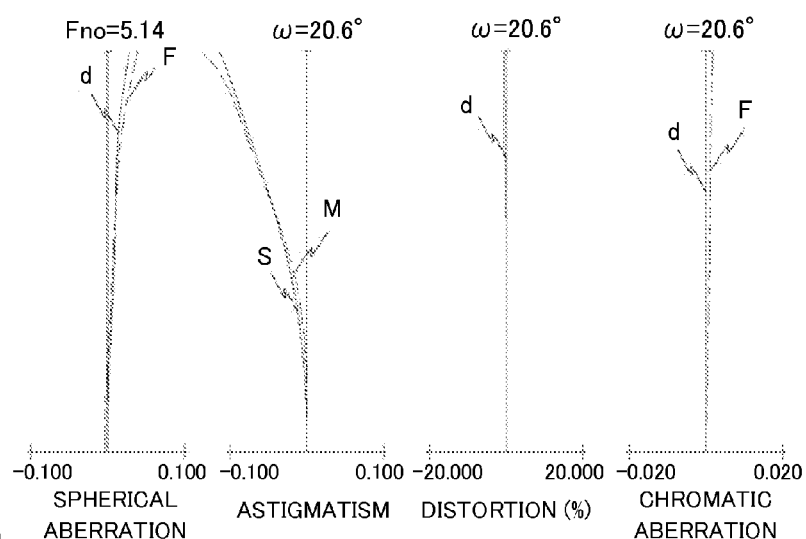
Figure 2C:
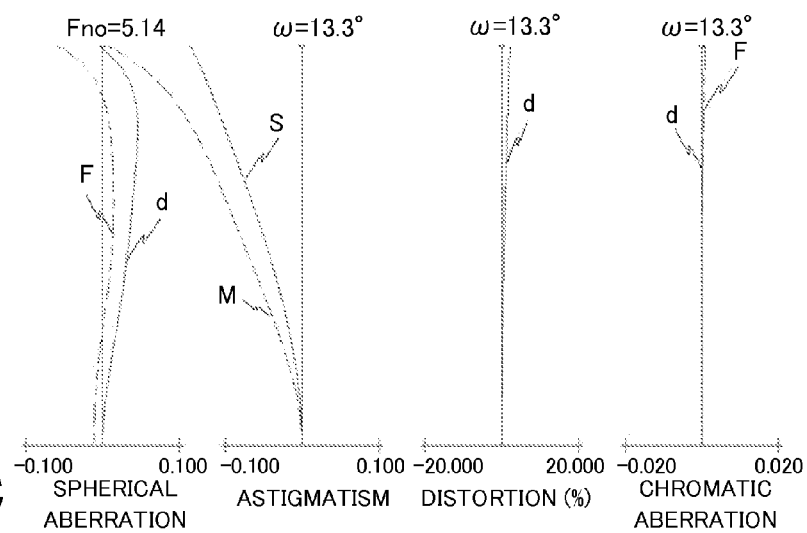

FIG. 1 is a lens sectional view of the wide angle end (short focus length end) of a zoom lens according to a numerical example 1 (first embodiment) of the present invention. FIGS. 2A, 2B, and 2C are aberrational diagrams at a wide angle end, an intermediate zoom position, and a telephoto end (long focus length end) of the zoom lens according to the numerical example 1. The zoom lens of the numerical example 1 has a zooming ratio of 3.93, and an aperture ratio 2.88 to 6.08.

Figure 3:
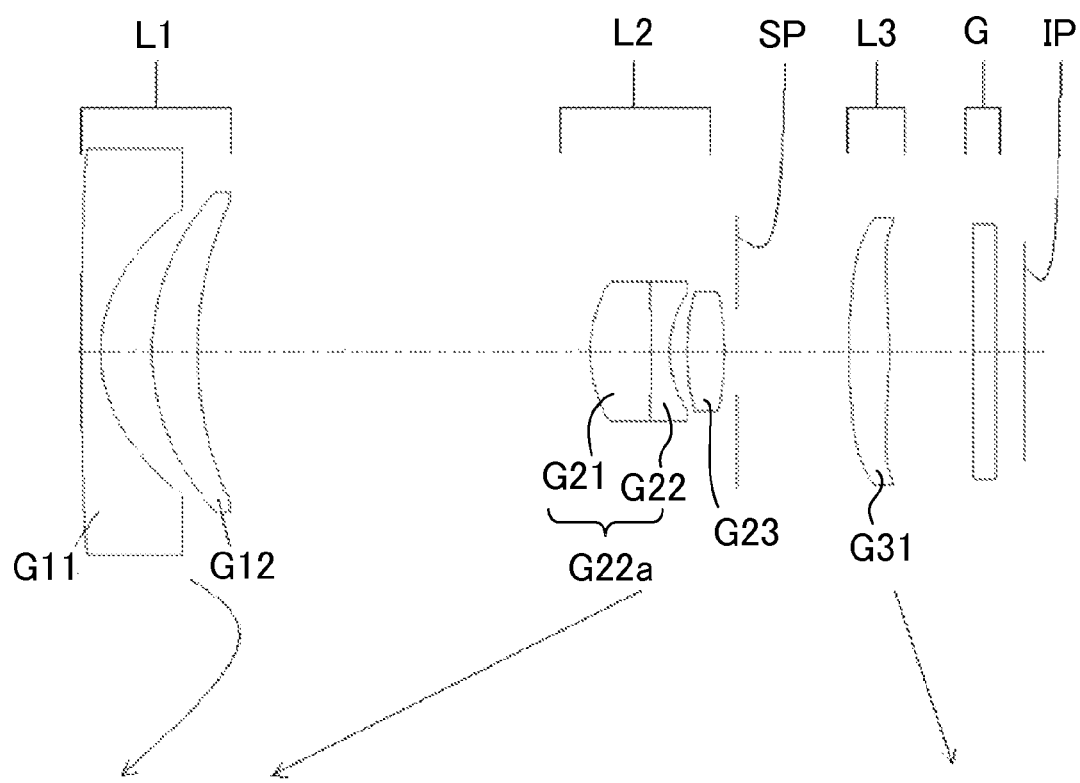
FIG. 3 is a lens sectional view at a wide angle end of the zoom lens according to a numerical example 2 (second embodiment) of the present invention.
Figure 4A:
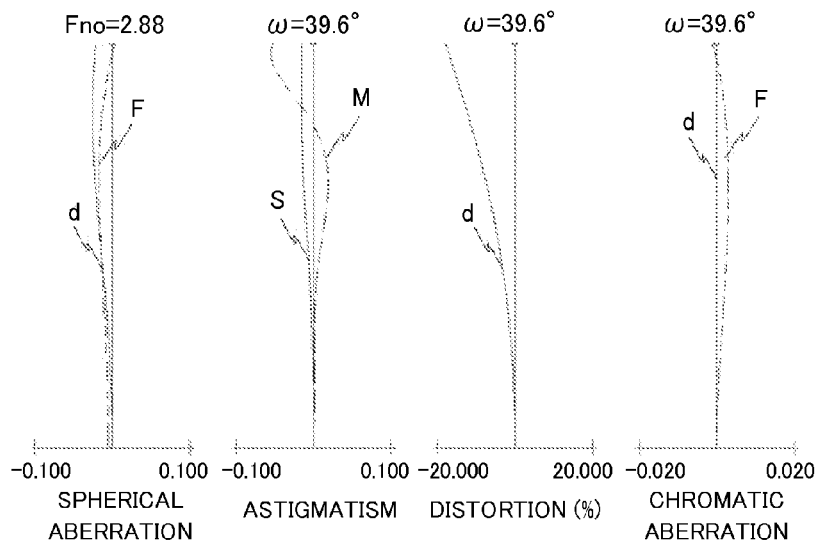
FIGS. 4A, 4B, and 4C are aberrational diagrams at a wide angle end, an intermediate zoom position, and a telephoto end of the zoom lens according to the numerical example 2 of the present invention.
Figure 4B:
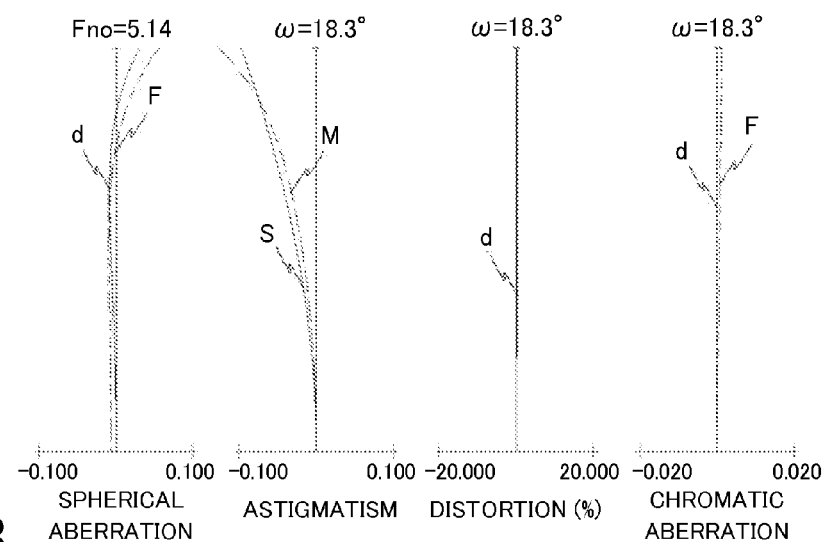
Figure 4C:
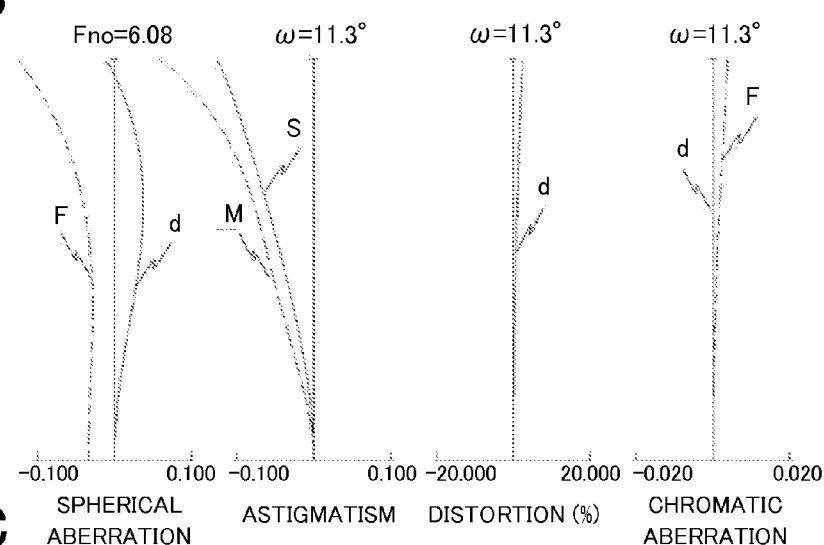

FIG. 3 is a lens sectional view at the wide angle end of a zoom lens according to a numerical example 2 (second embodiment) of the present invention. FIGS. 4A, 4B, and 4C are aberrational diagrams at a wide angle end, an intermediate zoom position, and a telephoto end of the zoom lens according to the numerical example 2. The zoom lens of the numerical example 2 has a zooming ratio of 4.71, and an aperture ratio 2.88 to 6.08.

Figure 5:
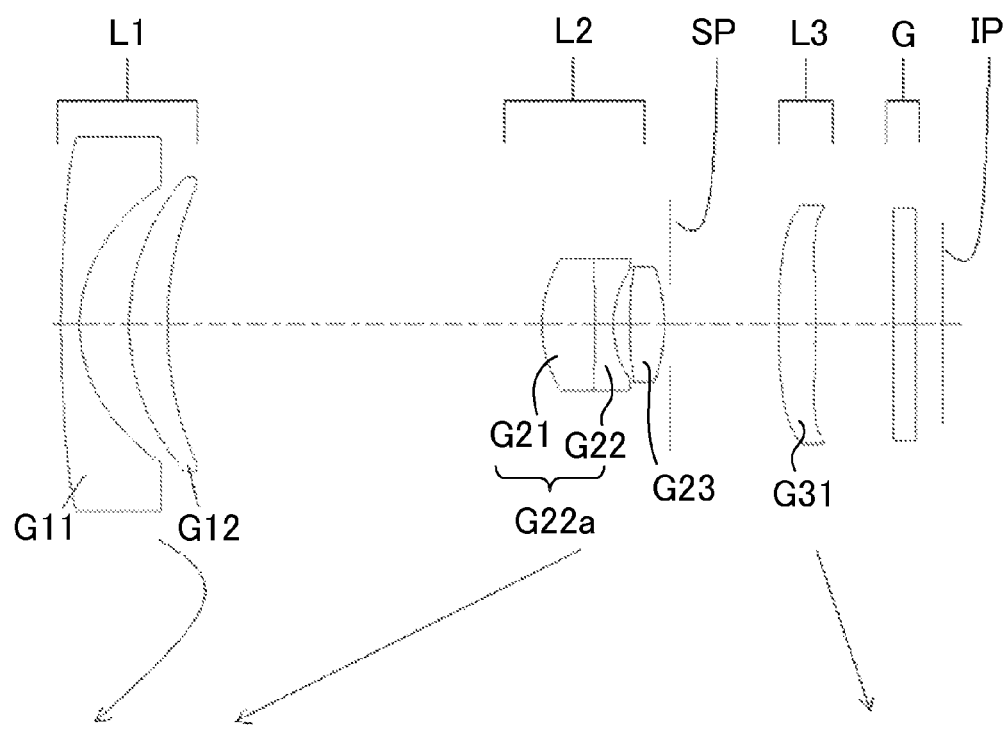
FIG. 5 is a lens sectional view at a wide angle end of the zoom lens according to a numerical example 3 (third embodiment) of the present invention.
Figure 6A:
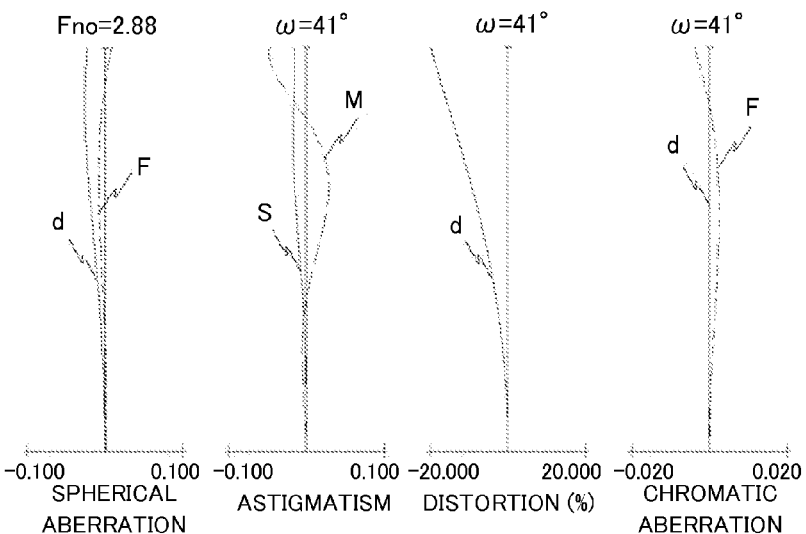
FIGS. 6A, 6B, and 6C are aberrational diagrams at a wide angle end, an intermediate zoom position, and a telephoto end of the zoom lens according to the numerical example 3 of the present invention.
Figure 6B:
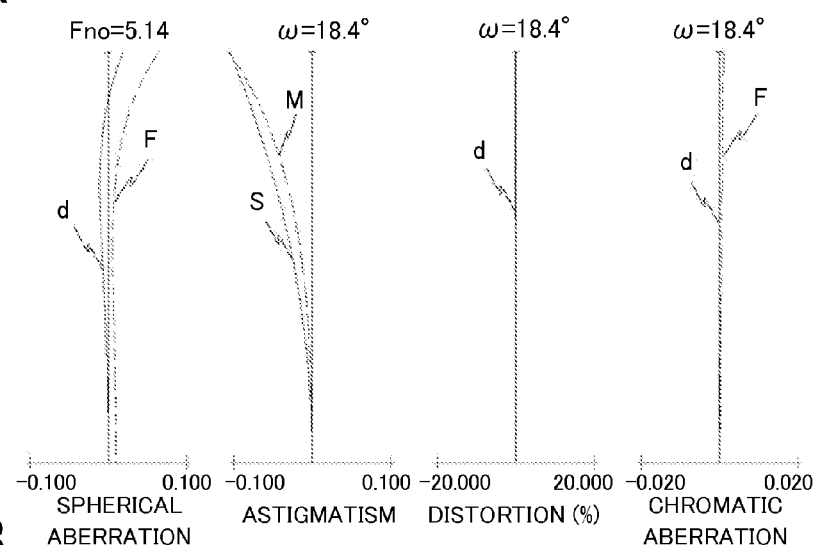
Figure 6C:
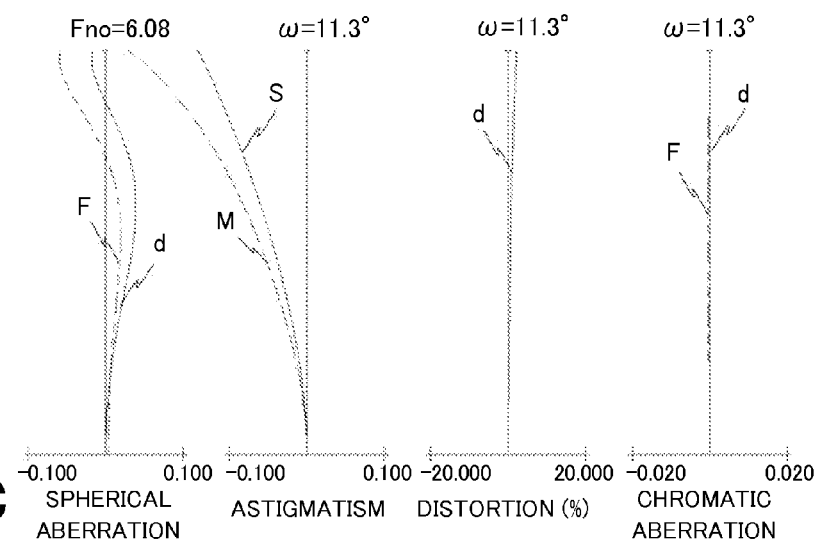

FIG. 5 is a lens sectional view at the wide angle end of the zoom lens according to a numerical example 3 (third embodiment) of the present invention. FIGS. 6A, 6B, and 6C are aberrational diagrams at a wide angle end, an intermediate zoom position, and a telephoto end of the zoom lens according to the numerical example 3. The zoom lens of the numerical example 3 has a zooming ratio of 4.95, and an aperture ratio 2.88 to 6.08.

Figure 7:
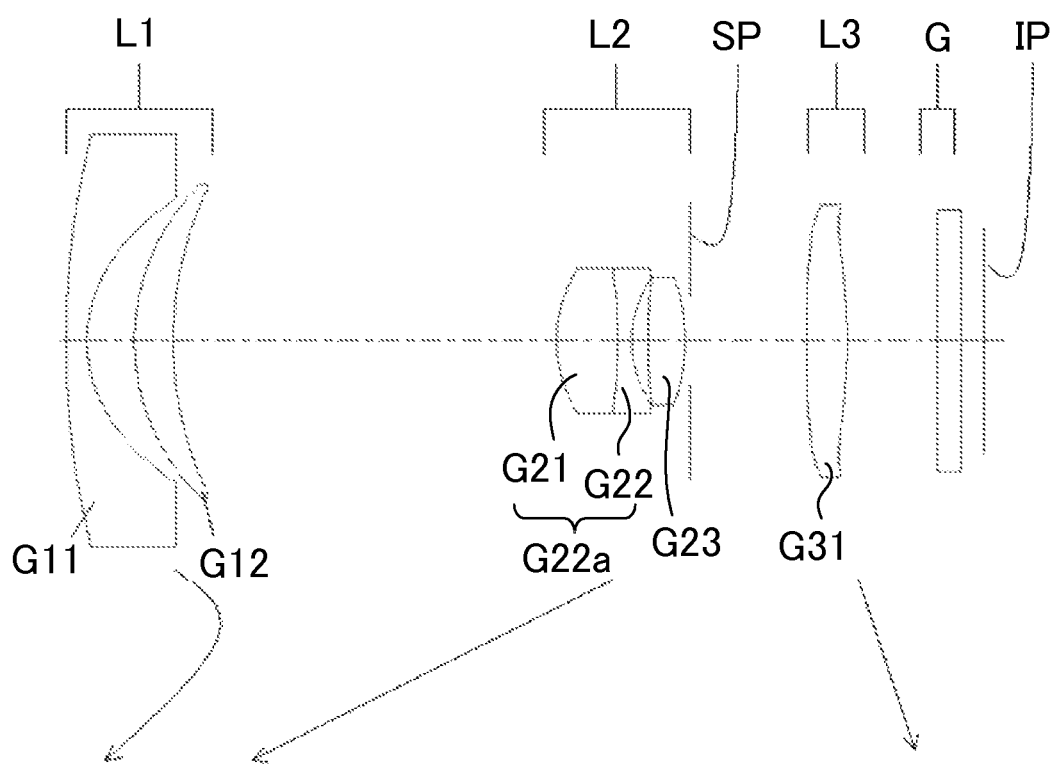
FIG. 7 is a lens sectional view at a wide angle end of the zoom lens according to a numerical example 4 (fourth embodiment) of the present invention.
Figure 8A:
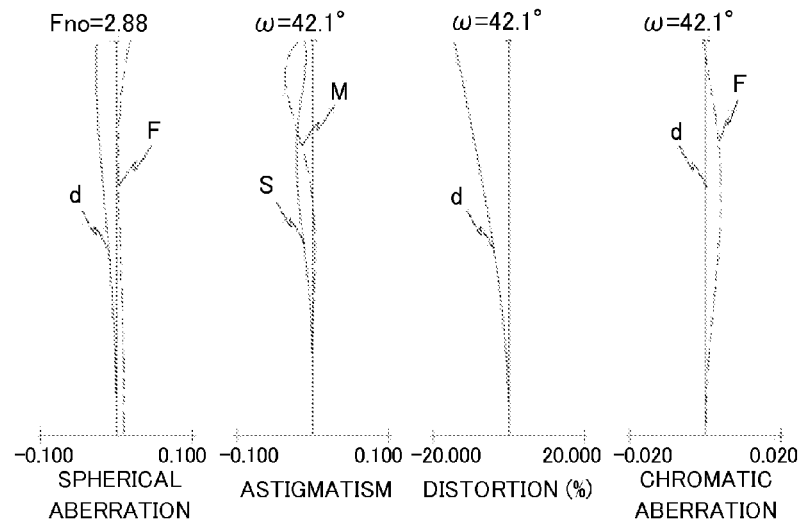
FIGS. 8A, 8B, and 8C are aberrational diagrams at a wide angle end, an intermediate zoom position, and a telephoto end of the zoom lens according to the numerical example 4 of the present invention.
Figure 8B:
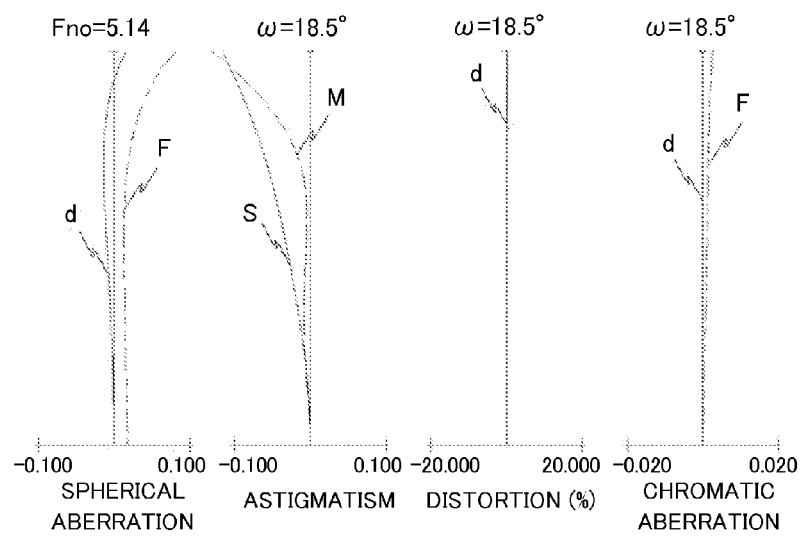
Figure 8C:
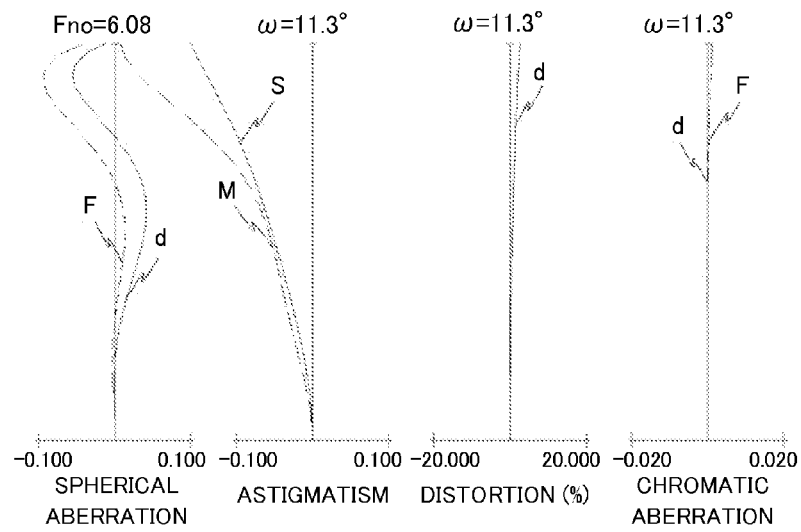

FIG. 7 is a lens sectional view at the wide angle end of the zoom lens according to a numerical example 4 of the present invention. FIGS. 8A, 8B, and 8C are aberrational diagrams at a wide angle end, an intermediate zoom position, and a telephoto end of the zoom lens according to the numerical example 4. The zoom lens of the numerical example 4 has a zooming ratio of 5.14, and an aperture ratio 2.88 to 6.08.

Figure 9:
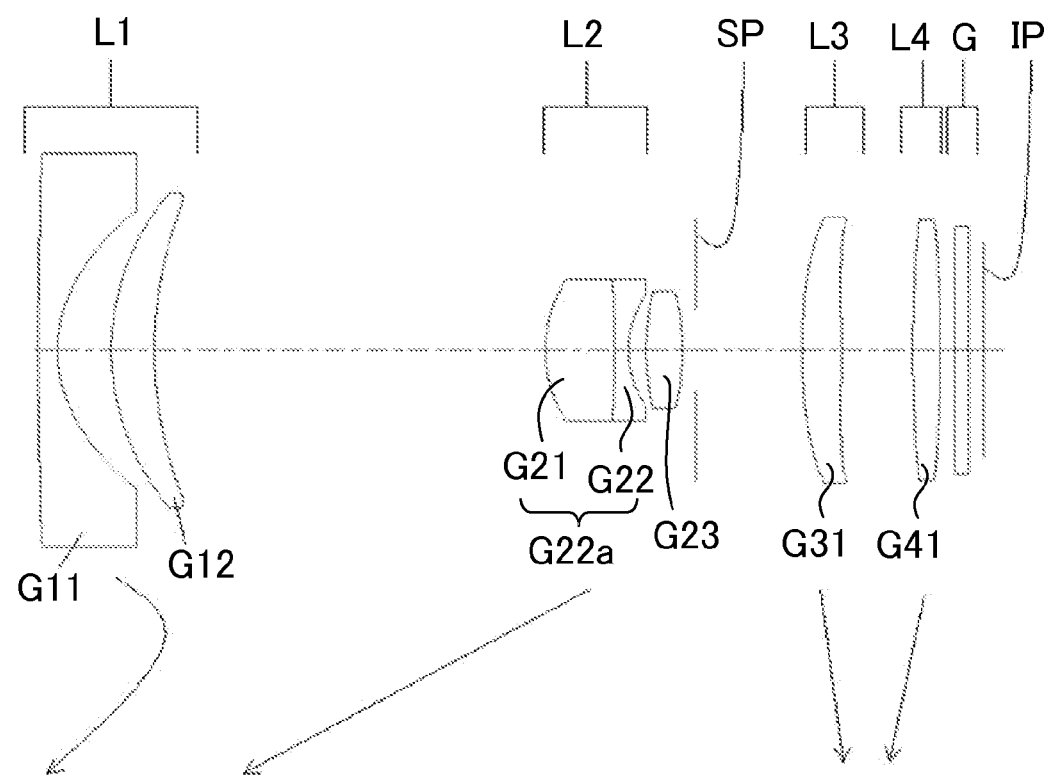
FIG. 9 is a lens sectional view at a wide angle end of the zoom lens according to a numerical example 5 (fifth embodiment) of the present invention.
Figure 10A:
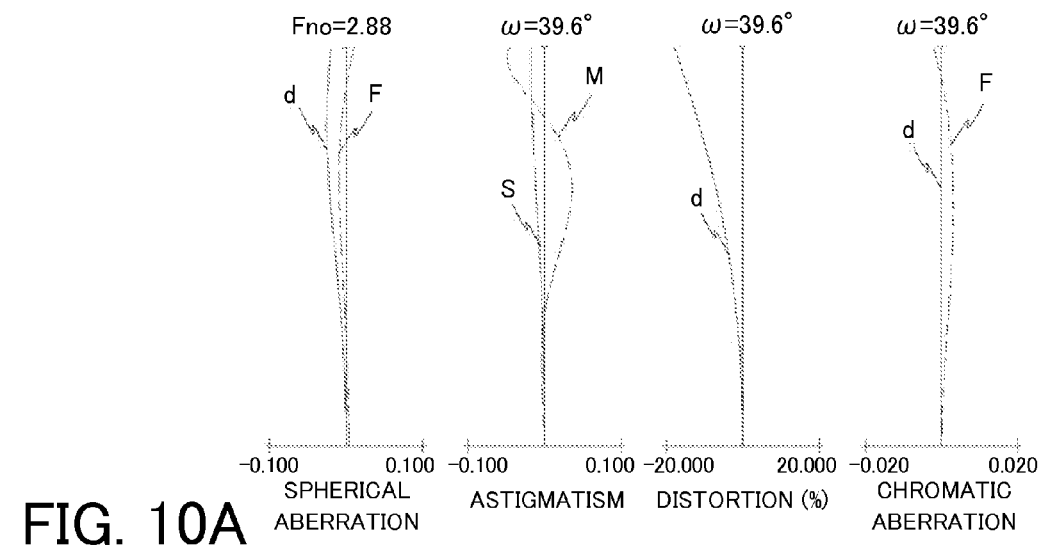
FIGS. 10A, 10B, and 10C are aberrational diagrams at a wide angle end, an intermediate zoom position, and a telephoto end of the zoom lens according to the numerical example 5 of the present invention.
Figure 10B:
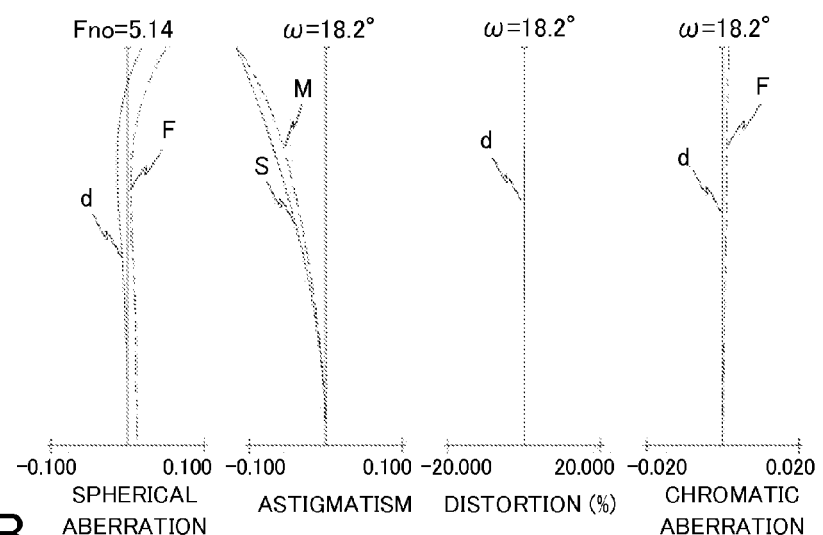
Figure 10C:
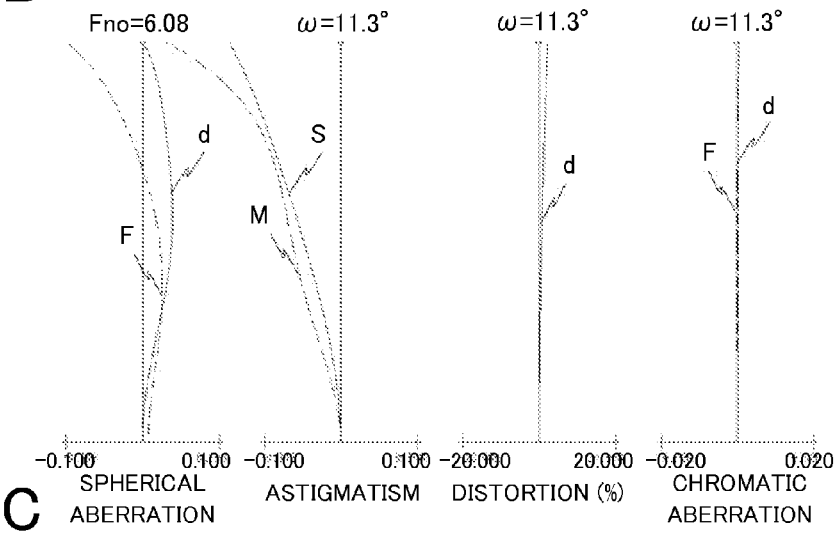
Figure 11:
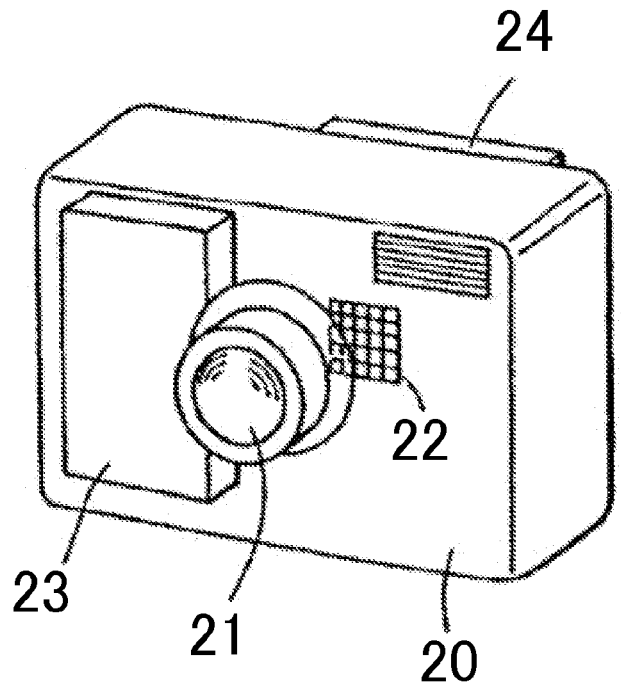
FIG. 11 is a schematic diagram of principal part of an image pickup apparatus according to this embodiment.
Figure 12:
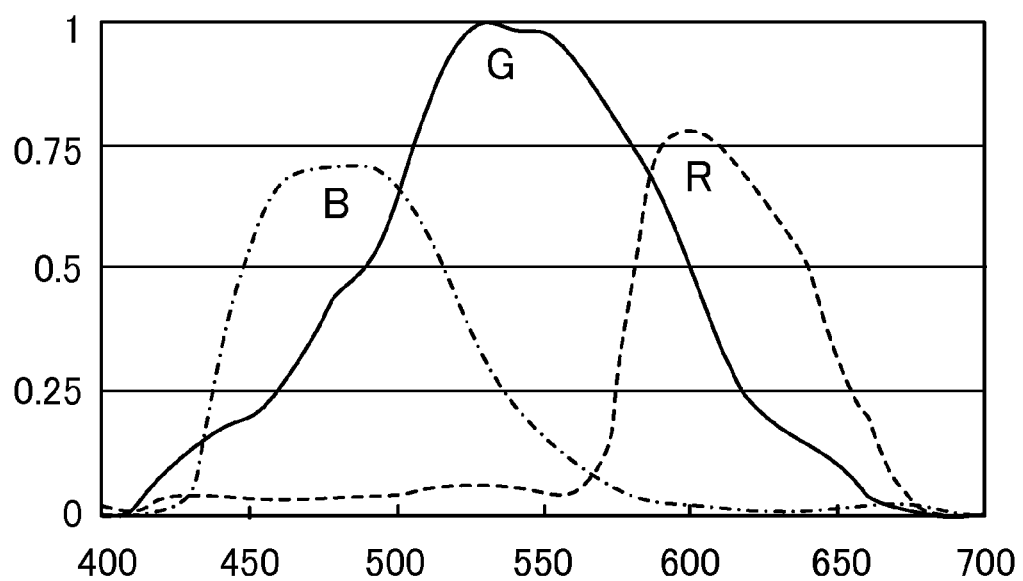
FIG. 12 is RGB signals sensitivity distributions of an image sensor.

FIG. 9 is a lens sectional view at the wide angle end of the zoom lens according to a numerical example 5 of the present invention. FIGS. 10A, 10B, and 10C are aberrational diagrams at a wide angle end, an intermediate zoom position, and a telephoto end of the zoom lens according to the numerical example 5 of the present invention. The zoom lens of the numerical example 5 has a zooming ratio of 4.71, and an aperture ratio 2.88 to 6.08. FIG. 11 is a schematic diagram of principal part of a digital still camera (image pickup apparatus including a zoom lens according to this embodiment. In the lens sectional view, the left side is the object side (front side) and the right side is the image side (rear side).

In the lens sectional view, "i" denotes an order of each lens unit from the object side to the image side, and Li denotes an i-th lens unit. SP denotes an F-number (Fno) determiner (referred to as an "aperture diaphragm" hereinafter) configured to determine or restrict a maximum aperture light flux. G denotes an optical block, such as an optical filter, a face plate, a crystal low-pass filter, and an infrared cut filter. IP denotes an image plane, on which an image pickup surface of an image sensor (photoelectric conversion element), such as a CCD and a CMOS sensor, is placed for an image pickup optical system in a video camera and a digital still camera, or a photosensitive surface corresponding to a film surface is placed for an image pickup optical system in a film-based camera.

In the aberrational diagram, "d" denotes the d-line, "F" denotes the F-line, "M" denotes a meridional image plane, and "S" denotes a sagittal image plane. The lateral chromatic aberration is expressed by a difference between the d-line as a reference and the F-line.

"Fno" denotes an F number. "ω" denotes half an image pickup angle of view. In each of the following numerical examples (or embodiments), the wide angle end and the telephoto end are mechanical zoom positions at both ends of a movable range along the optical axis. In the lens sectional view, an arrow denotes a locus of each lens unit during zooming from the wide angle end to the telephoto end.

In FIGS. 1, 3, 5, and 7 of the numerical examples 1 to 4, "L1" denotes a first lens unit of a negative refractive power (in which an optical power is an inverse of a focal length), "L2" denotes a second lens unit of a positive refractive power, and "L3" denotes a third lens unit of a positive refractive power. According to the zoom lens of the numerical examples 1 to 4, in zooming from the wide angle end to the telephoto end, the first lens unit L1 approximately reciprocates with a partially convex locus on the image side, and corrects the fluctuations of the image plane associated with the magnification variations. The second lens unit L2 monotonously moves to the object side and provides a major magnification variation.

The third lens unit L3 moves to the image side. In zooming from the wide angle end to the telephoto end, the interval between the first lens unit L1 and the second lens unit L2 narrows and the interval between the second lens unit L2 and the third lens unit L3 widens. The third lens unit L3 is moved to the object side for focusing from the infinite object to the close object. The F-number determiner SP is arranged on the image side of the second lens unit L2, and moved together with the second lens unit L2 in zooming.

In each lens unit, the second lens unit L2 is moved with a directional component perpendicular to the optical axis so as to move an image in the direction perpendicular to the optical axis. In other words, the second lens unit L2 may provide image stabilization. In the lens sectional view of the numerical example 5 illustrated in FIG. 9, "L1" denotes a first lens unit of a negative refractive power, "L2" denotes a second lens unit of a positive refractive power, "L3" denotes a third lens unit of a positive refractive power, and "L4" denotes a fourth lens unit of a positive refractive power.

According to the zoom lens of the numerical example 5, in zooming from the wide angle end to the telephoto end, the first lens unit L1 approximately reciprocates with a partially convex locus on the image side, and corrects the image plane fluctuation associated with the magnification variation. The second lens unit L2 monotonously moves to the object side and provides a major magnification variation. The third lens unit L3 moves to the image side. The fourth lens unit L4 moves to the object side. In zooming from the wide angle end to the telephoto end, the interval between the first lens unit L1 and the second lens unit L2 increases, the interval between the second lens unit L2 and the third lens unit L3 increases, and the interval between the third lens unit L3 and the fourth lens unit L4 decreases.

The third lens unit L3 is moved to the object side for focusing from the infinite object to the close object. The F-number determiner SP is located on the image side of the second lens unit L2, and moved together with the second lens unit L2 in zooming. The second lens unit L2 is moved with a directional component perpendicular to the optical axis so as to move an image in the direction perpendicular to the optical axis. In other words, the second lens unit L2 may provide image stabilization. In each lens sectional view, Gij denotes an ij-th lens.

In each numerical example, the first lens unit L1 includes, in order from the object side to the image side, an $11^{th}$ lens (negative lens) G11 of a negative refractive power, and a $12^{th}$ lens (positive lens) G12 of a positive refractive power. This configuration can properly correct the lateral chromatic aberration in a wavelength range from the F-line to the d-line, and miniaturize the first lens unit L1 by maintaining the minimum necessary lens number of the first lens unit L1.

The $11^{th}$ lens G11 is made of a low dispersion material and the $12^{th}$ lens G12 is made of a high dispersion material in the first lens unit L1. This configuration can maintain the refractive indices of the $11^{th}$ lens G11 and the $12^{th}$ lens G12 as small as possible which are necessary to properly correct the lateral chromatic aberration in the wavelength range from the F-line to the d-line, and maintain each lens and thereby the first lens unit L1 thin.

In each embodiment, the material of the $11^{th}$ lens G11 has an Abbe number vd11 and a partial dispersion ratio θg,F11. The material of the $12^{th}$ lens G12 has an Abbe number vd12 and a partial dispersion ratio θg,F12. The first lens unit L1 has a focal length f1, and the entire zoom lens has a focal length fT at the telephoto end. Then, the following conditional expressions are satisfied:

$$-0.6 < f1/fT < -0.1 \quad (1)$$

$$-0.020 < (\theta g,F11 - \theta g,F12)/(vd11 - vd12) < -0.004 \quad (2)$$

$$15 < vd11 - vd12 < 40 \quad (3)$$

Herein, assume that a partial dispersion ratio θg,F of the material is expressed by θg,F=(ng−nF)/(nF−nC) where "ng" denotes a refractive index of the g-line, "nF" denotes a refractive index of the F-line, and "nC" denotes a refractive index ofo the C-line. The conditional expressions (1) to (3) are effective to properly correct the lateral chromatic aberration and the curvature of field particularly, in the wavelength range from the F-line to the d-line.

The conditional expression (1) determines a range of the refractive power of the first lens unit L1. If the value is higher than the upper limit, the negative refractive power of the first lens unit L1 becomes excessively strong, it is difficult to fully correct the lateral chromatic aberration generated in the first lens unit L1, and the lateral chromatic aberration of the F-line increases to the underside at the wide angle end. If the value is lower than the lower limit in the conditional expression (1), a Petzval sum that occurs in the first lens unit L1 becomes excessively large, and it is difficult to correct the curvature of field that occurs in the positive direction at the wide angle end. In addition, it is necessary for the scheme of a wider angle of view and a higher zooming ratio to extend a moving distance of each lens unit, and the overall system becomes consequently larger.

The conditional expression (2) determines ratio between a difference of a partial dispersion ratio and a difference of an Abbe number of the materials of the $11^{th}$ lens G11 and the $12^{th}$ lens in the first lens unit L1. If the value is higher than the upper limit in the conditional expression (2), it is necessary to reduce a radius of curvature of each lens surface in the first lens unit L1 so as to correct the lateral chromatic aberration in the wavelength range from the F-line to the d-line. As a result, the radius of curvature of the lens surface of the $11^{th}$ lens G11, for example, becomes small and the field of curvature increases at the wide angle end. If the value is lower than the lower limit in the conditional expression (2), the lateral chromatic aberration deteriorates in the wavelength range from the g-line to the F-line.

The conditional expression (3) determines the Abbe number difference of the materials between the $11^{th}$ lens G11 and the $12^{th}$ lens G12 in the conditional expression (2). If the value is lower than the lower limit in the conditional expression (3), the Abbe number difference of the materials between the $11^{th}$ lens G11 and the $12^{th}$ lens G12 becomes excessively small. As a result, a radius of curvature of each lens surface in the first lens unit L1 becomes smaller and a field of curvature increases at the wide angle end so as to correct the lateral chromatic aberration in the wavelength range from the F-line to the d-line.

If the value is higher than the upper limit in the conditional expression (3), it is necessary to use a material having a low refractive index for the $11^{th}$ lens G11, the radius of curvature of the lens surface becomes excessively small so as to provide a desired refractive power to the first lens unit L1, and it becomes difficult to correct the lateral chromatic aberration. When the conditional expressions (1) to (3) are satisfied, it becomes easy to properly correct the lateral chromatic aberration and the curvature of field in the wavelength range from the F-line to the d-line. The numerical ranges of the conditional expressions (1) to (3) may be set as follows:

$$-0.6 < f1/fT < -0.2 \quad (1a)$$

$$-0.010 < (\theta g,F11 - \theta g,F12)/(vd11 - vd12) < -0.004 \quad (2a)$$

$$15 < vd11 - vd12 < 30 \quad (3a)$$

The numerical ranges of the conditional expressions (1a) to (3a) may be set as follows:

$$-0.6 < f1/fT < -0.4 \quad (1b)$$

$$-0.006 < (\theta g,F11 - \theta g,F12)/(vd11 - vd12) < -0.004 \quad (2b)$$

$$20 < vd11 - d12 < 30 \quad (3b)$$

In each embodiment, at least one of the following conditions may be satisfied:

Assume that Nd11 denotes a refractive index of the material of the $11^{th}$ lens G11, and Nd12 denotes a refractive index of the material of the $12^{th}$ lens G12. R11a denotes a radius of curvature of the lens surface of the $11^{th}$ lens G11 on the object side, and R11b denotes a radius of curvature of the lens surface of the $11^{th}$ lens G11 on the image side. R12b denotes a radius of curvature of the lens surface of the $12^{th}$ lens G12 on the image side. The second lens L2 has a focal length f2, and the third lens L3 has a focal length f3. Then, at least one of the following conditions may be satisfied:

$$1.90 < (Nd11 + Nd12)/2 < 2.30 \quad (4)$$

$$0.75 < (R11a - R11b)/(R11a + R11b) < 1.00 \quad (5)$$

$$0.40 < (R11a - R12b)/(R11a + R12b) < 0.80 \quad (6)$$

$$0.3 < |f1|/f3 < 0.5 \quad (7)$$

$$0.9 < |f1|/f2 < 1.2 \quad (8)$$

$$0.25 < f2/f3 < 0.50 \quad (9)$$

A description will now be given of a technical meaning of each conditional expression.

The conditional expression (4) determines an average refractive index of the materials of the $11^{th}$ lens G11 and the $12^{th}$ lens G12 in the first lens unit L1. If the value is lower than the lower limit in the conditional expression (4), the radius of curvature of each lens surface of the $11^{th}$ lens G11 and the $12^{th}$ lens G12 becomes excessively small so as to provide the desired refractive power to the first lens unit L1 and it becomes difficult to correct the lateral chromatic aberration. Since the lens becomes thicker, the miniaturization of the entire zoom lens becomes difficult. If the value is higher than the upper limit of the average refractive index and when the $11^{th}$ lens G11 and the $12^{th}$ lens G12 are made of low and high dispersion materials, it is difficult to find a proper material combination in the existing materials.

The numerical range of the conditional expression (4) may be set as follows:

$$1.95 < (Nd11 + Nd12)/2 < 2.20 \quad (4a)$$

The conditional expression (5) determines a shape factor (lens shape) of the $11^{th}$ lens G11. If the value is higher than the upper limit in the conditional expression (5), the radius of curvature of the lens surface on the image side in the $11^{th}$ lens G11 becomes excessively small, the lateral chromatic aberration of the F-line becomes biased to the underside at the image point around the screen, and the correction becomes difficult. If the value is lower than lower limit in the conditional expression (5), the radius of curvature of the lens surface on the image side is larger than that of the lens surface on the object side, the positive curvature of field increases at the image point around the screen at the wide angle end, and the correction becomes difficult. The numerical range of the conditional expression (5) may be set as follows:

$$0.755 < (R11a - R11b)/(R11a + R11b) < 0.950 \quad (5a)$$

The conditional expression (6) determines shapes of the incident surface (which is the lens surface on the object side of the $11^{th}$ lens G11) and the exit surface (which is the lens surface on the image side of the $12^{th}$ lens G12) in the first lens unit L1. If the value is higher than the upper limit in the conditional expression (6), the radius of curvature of the exit surface of the first lens unit L1 becomes improperly smaller than that of the incident surface, the lateral chromatic aberration of the F-line becomes biased to the underside and the correction becomes difficult.

If the value is lower than the lower limit in the conditional expression (6), the shape of the incident surface of the first lens unit L1 becomes excessively convex in comparison with the exit surface, a large amount of high order spherical aberration occurs on the telephoto side, and the correction becomes difficult. The numerical range of the conditional expression (6) may be set as follows:

$$0.45 < (R11a - R12b)/(R11a + R12b) < 0.78 \quad (6a)$$

The conditional expression (7) determines a refractive power ratio between the first lens L1 and the third lens L3. If the value is higher than the upper value in the conditional expression (7), the refractive power of the first lens unit L1 is improperly stronger than that of the third lens unit L3, the lateral chromatic aberration and the curvature of field increase in the overall zooming range, and the correction becomes difficult. If the value is lower than the lower limit in the conditional expression (7), refracting power of an off-axis light flux by the third lens unit L3 becomes weaker. Hence, the incident angle of the light flux upon the image plane becomes excessively high around the screen, the capture efficiency of the light flux upon the image sensor deteriorates, and an amount of shading increases.

The conditional expression (8) relates to a ratio of a focal length between the first lens unit L1 and the second lens unit L2. If the value is higher than the upper limit in the conditional expression (8), the refractive power of the second lens unit L2 becomes excessively strong and the corrections of the spherical aberration and the coma become difficult in the overall zooming range. If the value is lower than the lower limit, the refractive power of the first lens unit L1 becomes excessively strong, it becomes difficult to fully correct the lateral chromatic aberration that occurs in the first lens unit L1, and the lateral chromatic aberration of the F-line becomes biased to the underside at the wide angle end.

Alternatively, the refractive power of the second lens unit L2 becomes excessively weak and the lens overall length becomes longer because it is necessary for a high zooming ratio to increase a moving amount of the second lens unit L2.

The conditional expression (9) relates to a ratio of a focal length between the second lens unit L2 and the third lens unit L3. If the value is higher the upper limit in the conditional expression (9), the refractive power of the third lens unit L3 becomes excessively strong, the fluctuation of the lateral chromatic aberration becomes significant during focusing, and the lateral chromatic aberration of the F-line is particularly biased to the underside in focusing upon the close object at the telephoto end. When the value is lower than the lower limit, the refractive power of the third lens unit L3 becomes excessively weak, a moving amount of the third lens unit L3 increases during focusing, and the lens overall length increases.

The numerical values of the conditional expressions (8) and (9) may be set as follows:

$$0.95 < |f1|/f2 < 1.10 \quad (8a)$$

$$0.30 < f2/f3 < 0.45 \quad (9a)$$

When the zoom lens according to each numerical example is applied to an image pickup apparatus having an image sensor, a system configured to image-process and to correct an electric signal that contains the distortion and the lateral chromatic aberration may be used together. This configuration is likely to electrically correct the distortion at the wide angle end and the correcting residue of the lateral chromatic aberration in the wavelength range from the F-line to the d-line. Thereby, a high optical performance can be obtained in overall zooming range.

Each numerical example can provide a compact zoom lens having a high resolving power, and properly correct the lateral chromatic aberration in a wide wavelength range from the F-line (486.13 nm) to the d-line (587.56 nm) while maintaining a high angle of field and a high zooming ratio.

A description will now be given of a characteristic of the zooming lens in each numerical example. According to the zoom lenses of the numerical examples 1 to 4, in zooming from the wide angle end to the telephoto end, the first lens unit L1 approximately reciprocates with a partially convex locus on the image side, the second lens unit L2 moves to the object side, and the third lens unit L3 moves to the image side. At this time, the interval between the first lens L1 and the second lens L2 is narrower at the telephoto end than at the wide angle end, and the interval between the second lens unit L2 and the third lens unit L3 is wider at the telephoto end than at the wide angle end.

In zooming, the second lens unit L2 and the third lens unit L3 move and provide magnification variations, and the first lens unit L1 reciprocates and corrects fluctuations of the image plane associated with the magnification variations. The aperture diaphragm SP is arranged on the image side of the second lens unit L2 along the optical axis direction. Since the aperture diaphragm SP is thus arranged, the interval between the first lens unit L1 and the second lens unit L2 can be reduced at the telephoto end, and thus the moving amount of the second lens unit L2 to the object side can be sufficiently maintained for zooming.

This configuration can mitigate an increase of the lens overall length at the telephoto end while maintaining a high zooming ratio. In addition, at each zooming position, the minimum Fno may be determined at each zoom position by varying the aperture size of the aperture diaphragm SP. Since an F number may be individually set for each of the wide angle end and the telephoto end, this configuration can reduce fluctuations of the F numbers at the wide angle end and the telephoto end and prevent an increase of an effective diameter of the second lens unit L2. The aperture size of the aperture diaphragm SP may be fixed in zooming.

The zoom lens of the numerical example 5 illustrated in FIG. 9 is different from the three-unit zoom lenses of the numerical examples 1 to 4 in that there is the fourth lens unit L4 of the positive power on the image side of the third lens unit L3. The fourth lens unit L4 moves to the object side in zooming from the wide angle end to the telephoto end. The other structure is similar to that disclosed in the numerical examples 1 to 4.

In each embodiment, the $11^{th}$ lens G11 has a meniscus shape having a convex surface on the object side. The $12^{th}$ lens G12 has a meniscus shape having a convex surface on the object side. The second lens unit L2 includes, in order from the object side to the image side, a cemented lens G22a made by joining a $21^{st}$ lens G21 of a positive refractive power having a convex surface on the object side, a $22^{nd}$ lens G22 of a negative refractive power having a concave surface on the image side, and a $23^{rd}$ lens G23 of a positive refractive power. The third lens unit L3 includes a single $31^{st}$ lens G31 of a positive refractive power. The fourth lens unit L4 includes a single $41^{st}$ lens G41 of a positive refractive power in the numerical example 5.

Referring now to FIG. 11, a description will be given of an embodiment of a digital camera as an image pickup apparatus according to the present invention. In FIG. 11, reference numeral 20 denotes a camera body, and reference numeral 21 denotes an image pickup optical system that includes a zoom lens according to the present invention. Reference numeral 22 denotes an image sensor (photoelectric conversion element), such as a CCD sensor and a CMOS sensor, configured to receive light of an image formed by the image pickup optical system 21. Reference numeral 23 denotes a memory used to store information corresponding to an object image photoelectrically converted by the image sensor 22. Reference numeral 24 denotes a viewfinder, such as a liquid crystal panel, configured to enable a user to observe an object image formed on the image sensor 22.

This embodiment provides a compact image pickup apparatus having a high optical performance. Next follows numerical examples of the embodiments of the present invention. In each numerical example, "i" denotes a surface order from the object side, "ri" denotes a radius of curvature of a lens surface, "di" denotes a lens thickness and an air interval between the i-th surface and the i+1-th surface, ndi and vdi denote the refractive index to the d-line and the Abbe number. Two surfaces closest to the image denote a filter member (optical block), such as a crystal low-pass filter, and an infrared cut filter. BF denotes a back focus, representing a distance from the surface on the image side of the optical block.

The aspheric shape is expressed by the following expression:

$$x = \frac{(1/R)H^2}{1+\sqrt{1-(1+K)(H/R)^2}} + A4 \times H^4 + A6 \times H^6 + A8 \times H^8 + A10 \times H^{10} + A12 \times H^{12} + A14 \times H^{14}$$

Herein, an X axis is set to the optical axis direction. An H axis is set to a direction perpendicular to the optical axis. A light traveling direction is set positive. R denotes a paraxial radius of curvature. K denotes a conic constant. A4, A6, A8, A10, A12, and A14 are aspheric coefficients. [e+X] denotes [×10+x], and [e−X] denotes [×10−x]. The aspheric surface is expressed by an asterisk * added to the surface number. Table 1 summarizes a relationship between each conditional expression and numerical examples.

Numerical Example 1

| Unit mm | | | | |
|---|---|---|---|---|
| surface data | | | | |
| surface number | r | d | nd | vd |
| 1 | 100.506 | 0.70 | 1.88300 | 40.8 |
| 2* | 5.100 | 2.22 | | |
| 3 | 8.741 | 2.20 | 2.14352 | 17.8 |
| 4 | 13.045 | (variable) | | |
| 5* | 4.726 | 2.11 | 1.85135 | 40.1 |
| 6 | −241.727 | 0.68 | 1.80518 | 25.5 |
| 7 | 3.756 | 0.62 | | |
| 8* | 8.916 | 1.30 | 1.55332 | 71.7 |
| 9* | −9.327 | 0.46 | | |
| 10 (diaphragm) | ∞ | (variable) | | |
| 11* | 33.968 | 1.40 | 1.58313 | 59.5 |
| 12* | −21.711 | (variable) | | |
| 13 | ∞ | 0.80 | 1.51633 | 64.1 |
| 14 | ∞ | | | |
| image plane | ∞ | | | | aspheric surface data second surface

K = −1.12757e+000  A4 = 5.22323e−004  A6 = 7.48195e−006
A8 = −3.17601e−007  A10 = 1.14170e−008  A12 = −1.72097e−010
A14 = 6.97497e−013 fifth surface

K = −9.53205e−001  A4 = 5.79473e−004  A6 = −6.57755e−006
A8 = 1.61607e−006 eighth surface

K = −2.14952e+001  A4 = 2.90082e−003  A6 = −9.59881e−005
A8 = −3.05030e−005

-continued

Unit mm ninth surface

K = −1.62937e−001  A4 = −1.02222e−003  A6 = 1.72899e−004
A8 = −5.30654e−005 eleventh surface

K = 2.67092e+001  A4 = 7.51691e−004  A6 = −1.69912e−005
A8 = 1.21998e−006  A10 = 1.06676e−010  A12 = 2.56854e−010 twelfth surface

K = −5.19998e+001  A4 = 5.51747e−004  A6 = 6.35788e−006
A8 = 6.77639e−007  A10 = 2.81985e−009  A12 = 9.35952e−010 various data
zoom ratio 3.93

| | | | |
|---|---|---|---|
| focal length | 4.18 | 10.32 | 16.43 |
| F-number | 2.88 | 5.14 | 6.08 |
| angle of view | 39.18 | 20.58 | 13.27 |
| image height | 3.41 | 3.88 | 3.88 |
| lens overall length | 33.63 | 31.07 | 36.04 |
| BF | 0.52 | 0.52 | 0.52 |
| d4 | 13.09 | 3.02 | 0.46 |
| d10 | 4.09 | 11.56 | 19.03 |
| d12 | 3.45 | 3.49 | 3.54 | zoom lens unit data

| unit | starting surface | focal length |
|---|---|---|
| 1 | 1 | −9.64 |
| 2 | 5 | 9.31 |
| 3 | 11 | 22.93 |

Numerical Example 2

Unit mm surface data

| surface number | r | d | nd | vd |
|---|---|---|---|---|
| 1* | 88.000 | 0.70 | 1.88300 | 40.8 |
| 2* | 4.871 | 1.82 | | |
| 3 | 8.199 | 1.58 | 2.14352 | 17.8 |
| 4 | 12.811 | 0.46 | | |
| 5* | 4.649 | 2.14 | 1.85135 | 40.1 |
| 6 | −97.876 | 0.65 | 1.80518 | 25.5 |
| 7 | 3.726 | 0.62 | | |
| 8* | 8.810 | 1.30 | 1.55332 | 71.7 |
| 9* | −10.029 | (variable) | | |
| 10 (diaphragm) | ∞ | (variable) | | |
| 11* | 29.598 | 1.40 | 1.58313 | 59.5 |
| 12* | −22.726 | (variable) | | |
| 13 | ∞ | 0.80 | 1.51633 | 64.1 |
| 14 | ∞ | | | |
| image plane | ∞ | | | | aspheric surface data first surface

K = 1.48604e+002  A4 = −1.35119e−004  A6 = 4.12531e−007
A8 = 2.99213e−008  A10 = 1.84480e−011  A12 = −1.09388e−011 second surface

K = −1.05144e+000  A4 = 4.01906e−004  A6 = −2.14566e−006
A8 = 1.33034e−007  A10 = 1.14170e−008  A12 = −2.69394e−010
A14 = 6.97497e−013

-continued

Unit mm fifth surface

K = −9.17854e−001  A4 = 5.56333e−004  A6 = −1.67296e−005
A8 = 1.08584e−006 eight surface

K = −1.33480e+001  A4 = 2.43735e−003  A6 = 1.31166e−004
A8 = 4.75368e−006 ninth surface

K = −2.37419e+000  A4 = −5.51195e−004  A6 = 1.54215e−004
A8 = −5.08123e−006 eleventh surface

K = 3.99945e+000  A4 = 7.47048e−004  A6 = −1.30679e−005
A8 = 1.14464e−006  A10 = 9.00951e−011  A12 = 3.19277e−010 twelfth surface

K = −3.79170e+001  A4 = 6.82283e−004  A6 = −2.43754e−006
A8 = 8.94031e−007  A12 = 9.35952e−010 various data
zoom ratio 4.71

| | | | |
|---|---|---|---|
| focal length | 4.12 | 11.74 | 19.40 |
| F-number | 2.88 | 5.14 | 6.08 |
| angle of view | 39.61 | 18.26 | 11.30 |
| image height | 3.41 | 3.88 | 3.88 |
| lens overall length | 33.13 | 31.62 | 38.75 |
| BF | 1.03 | 1.03 | 1.03 |
| d4 | 13.77 | 2.79 | 0.45 |
| d10 | 3.92 | 13.43 | 22.94 |
| d12 | 2.94 | 2.90 | 2.86 | zoom lens unit data

| unit | starting surface | focal length |
|---|---|---|
| 1 | 1 | −9.60 |
| 2 | 5 | 9.32 |
| 3 | 11 | 22.26 |

Numerical Example 3

Unit mm surface data

| surface number | r | d | nd | vd |
|---|---|---|---|---|
| 1* | 55.775 | 0.70 | 2.03972 | 40.4 |
| 2* | 5.373 | 1.87 | | |
| 3 | 8.467 | 1.45 | 2.10205 | 16.8 |
| 4 | 13.401 | (variable) | | |
| 5* | 4.589 | 2.01 | 1.85135 | 40.1 |
| 6 | −40.812 | 0.68 | 1.80518 | 25.5 |
| 7 | 3.771 | 0.62 | | |
| 8* | 12.507 | 1.30 | 1.55332 | 71.7 |
| 9* | −7.711 | 0.24 | | |
| 10 (diaphragm) | ∞ | (variable) | | |
| 11* | 29.375 | 1.40 | 1.58313 | 59.5 |
| 12* | −32.692 | | | |
| 13 | ∞ | 0.80 | 1.51633 | 64.1 |
| 14 | ∞ | (variable) | | |
| image plane | ∞ | | | |

-continued

Unit mm aspheric surface data first surface

K = 5.57862e+001   A4 = −7.71380e−005   A6 = 1.48289e−006
A8 = 5.02698e−009   A10 = −2.14727e−010   A12 = −6.23872e−012 second surface

K = −9.66332e−001   A4 = 3.61547e−004   A6 = 2.46915e−006
A8 = 1.71086e−007   A10 = 1.14170e−008   A12 = −3.31567e−010
A14 = 6.97497e−013 fifth surface

K = −6.43510e−001   A4 = 2.53492e−004   A6 = −1.59481e−005
A8 = 1.14361e−006   A12 = −2.58006e−014 eighth surface

K = −4.87370e+000   A4 = −1.67198e−003   A6 = 2.35658e−004
A8 = −6.63398e−005 ninth surface

K = 3.97291e+000   A4 = −7.38132e−004   A6 = 1.60014e−004
A8 = −5.22186e−005 eleventh surface

K = 2.37665e+001   A4 = 6.12067e−004   A6 = −1.43037e−005
A8 = 1.73712e−006   A12 = −1.68803e−010 twelfth surface

K = 3.74825e+001   A4 = 1.14514e−003   A6 = −1.29988e−005
A8 = 2.11995e−006   A12 = 9.35952e−010 various data
zoom ratio 4.95

| | | | |
|---|---|---|---|
| focal length | 3.92 | 11.64 | 19.40 |
| F-number | 2.88 | 5.14 | 6.08 |
| angle of view | 41.03 | 18.41 | 11.30 |
| image height | 3.41 | 3.88 | 3.88 |
| lens overall length | 33.26 | 31.47 | 38.75 |
| BF | 1.03 | 1.03 | 1.03 |
| d4 | 14.12 | 2.75 | 0.44 |
| d10 | 4.08 | 13.71 | 23.34 |
| d12 | 2.96 | 2.91 | 2.86 | zoom lens unit data

| unit | starting surface | focal length |
|---|---|---|
| 1 | 1 | −9.05 |
| 2 | 5 | 9.14 |
| 3 | 11 | 26.76 |

Numerical Example 4

Unit mm surface data

| surface number | r | d | nd | νd |
|---|---|---|---|---|
| 1* | 35.211 | 0.70 | 2.03972 | 40.4 |
| 2* | 4.701 | 1.62 | | |
| 3 | 7.481 | 1.32 | 2.10205 | 16.8 |
| 4 | 12.108 | (variable) | | |
| 5* | 4.480 | 2.09 | 1.85135 | 40.1 |
| 6 | −17.619 | 0.47 | 1.80518 | 25.5 |
| 7 | 3.782 | 0.55 | | |
| 8* | 14.413 | 1.27 | 1.55332 | 71.7 |
| 9* | −7.155 | 0.19 | | |
| 10 (diaphragm) | ∞ | (variable) | | |
| 11* | 40.761 | 1.40 | 1.58313 | 59.5 |
| 12* | −18.847 | (variable) | | |
| 13 | ∞ | 0.80 | 1.51633 | 64.1 |
| 14 | ∞ | | | |
| image plane | ∞ | | | | aspheric surface data first surface

K = 1.79697e+001   A4 = 4.65889e−005   A6 = −8.87048e−007
A8 = 1.54431e−008   A10 = −9.71293e−010   A12 = 5.50899e−012 second surface

K = −9.21491e−001   A4 = 6.51932e−004   A6 = 4.59250e−006
A8 = 2.94972e−007   A10 = 1.14170e−008   A12 = −7.75143e−010
A14 = 6.97497e−013 fifth surface

K = −6.59728e−001   A4 = 2.15749e−004   A6 = −1.96571e−005
A8 = −8.66399e−007   A12 = 3.51503e−009 eighth surface

K = −9.11569e+000   A4 = −1.84052e−003   A6 = 2.67416e−004
A8 = −1.87259e−005 ninth surface

K = 4.02986e+000   A4 = −6.15745e−004   A6 = 2.13941e−004
A8 = −2.15824e−005   A10 = −1.19250e−008 eleventh surface

K = −1.38433e+002   A4 = 5.53869e−004   A6 = −5.26681e−005
A8 = 3.16059e−006   A12 = −9.81690e−010 twelfth surface

K = 1.44537e+001   A4 = 7.69116e−004   A6 = −3.03137e−005
A8 = 2.58150e−006   A12 = 9.35952e−010 various data
zoom ratio 5.14

| | | | |
|---|---|---|---|
| focal length | 3.78 | 11.59 | 19.40 |
| F-number | 2.88 | 5.14 | 6.08 |
| angle of view | 42.09 | 18.48 | 11.30 |
| image height | 3.41 | 3.88 | 3.88 |
| lens overall length | 31.33 | 30.76 | 38.75 |
| BF | 0.77 | 0.77 | 0.77 |
| d4 | 13.10 | 2.48 | 0.42 |
| d10 | 3.95 | 13.99 | 24.03 |
| d12 | 3.09 | 3.10 | 3.12 | zoom lens unit data

| unit | starting surface | focal length |
|---|---|---|
| 1 | 1 | −8.60 |
| 2 | 5 | 8.74 |
| 3 | 11 | 22.29 |

Numerical Example 5

Unit mm surface data

| surface number | r | d | nd | νd |
|---|---|---|---|---|
| 1* | 93.993 | 0.70 | 1.88300 | 40.8 |
| 2* | 4.791 | 1.94 | | |
| 3 | 8.772 | 1.55 | 2.14352 | 17.8 |
| 4 | 14.640 | (variable) | | |

-continued

Unit mm

| | | | | |
|---|---|---|---|---|
| 5* | 4.591 | 2.50 | 1.85135 | 40.1 |
| 6 | −34.920 | 0.50 | 1.80518 | 25.5 |
| 7 | 3.579 | 0.63 | | |
| 8* | 9.086 | 1.30 | 1.55332 | 71.7 |
| 9* | −9.839 | 0.46 | | |
| 10 (diaphragm) | ∞ | (variable) | | |
| 11* | 22.267 | 1.40 | 1.58313 | 59.5 |
| 12* | −59.189 | (variable) | | |
| 13 | 50.000 | 1.00 | 1.51633 | 64.1 |
| 14 | −50.000 | (variable) | | |
| 15 | ∞ | 0.50 | 1.51633 | 64.1 |
| 16 | ∞ | | | |
| image plane | ∞ | | | | aspheric surface data first surface

K = 1.71859e+002    A4 = −1.64078e−004    A6 = 2.06163e−007
A8 = 4.27964e−008    A10 = −6.21705e−011    A12 = −1.14345e−011 second surface

K = −1.14617e+000    A4 = 4.28021e−004    A6 = −4.99773e−006
A8 = 1.14281e−007    A10 = 1.14170e−008    A12 = −2.52677e−010
A14 = 6.97497e−013 fifth surface

K = −1.12886e+000    A4 = 9.44942e−004    A6 = −3.83783e−006
A8 = 1.38766e−006 eighth surface

K = −1.46489e+001    A4 = 1.40536e−003    A6 = −5.22821e−005
A8 = −4.25627e−005 ninth surface

K = 4.23754e+000    A4 = −5.39069e−004    A6 = 2.65822e−005
A8 = −4.24268e−005    A10 = −2.01686e−011 eleventh surface

K = −3.80856e+000    A4 = 6.85871e−004    A6 = −1.66450e−005
A8 = 2.03099e−007    A10 = 3.89238e−009    A12 = 4.75889e−010 twelfth surface

K = −2.93401e+002    A4 = 7.21385e−004    A6 = −1.02932e−005
A8 = −8.49219e−008    A12 = 9.35952e−010 various data
zoom ratio 4.71

| | | | |
|---|---|---|---|
| focal length | 4.12 | 11.79 | 19.40 |
| F-number | 2.88 | 5.14 | 6.08 |
| angle of view | 39.61 | 18.20 | 11.30 |
| image height | 3.41 | 3.88 | 3.88 |
| lens overall length | 33.97 | 32.56 | 39.99 |
| BF | 0.53 | 0.53 | 0.53 |
| d4 | 14.04 | 2.83 | 0.46 |
| d10 | 3.84 | 13.84 | 23.84 |
| d12 | 2.58 | 1.87 | 1.17 |
| d14 | 0.50 | 1.00 | 1.51 | zoom lens unit data

| unit | starting surface | focal length |
|---|---|---|
| 1 | 1 | −9.57 |
| 2 | 5 | 9.47 |
| 3 | 11 | 27.92 |
| 4 | 13 | 48.58 |

TABLE 1

| conditional expression | | range of the conditional expression | | embodiment | | | | |
|---|---|---|---|---|---|---|---|---|
| | | lower limit | upper limit | 1 | 2 | 3 | 4 | 5 |
| | f1 | | | −9.64 | −9.60 | −9.05 | −8.60 | −9.57 |
| | f2 | | | 9.31 | 9.32 | 9.14 | 8.74 | 9.47 |
| | f3 | | | 22.93 | 22.26 | 26.76 | 22.29 | 27.92 |
| | fw | | | 4.18 | 4.12 | 3.92 | 3.78 | 4.12 |
| | ft | | | 16.43 | 19.40 | 19.40 | 19.40 | 19.40 |
| | f4 | | | | | | | 48.58 |
| (1) | f1/fT | −0.60 | −0.10 | −0.59 | −0.49 | −0.47 | −0.44 | −0.49 |
| (2) | value in the conditional expression | −0.0200 | −0.0040 | −0.0041 | −0.0041 | −0.0055 | −0.0055 | −0.0041 |
| | θg, F11 | | | 0.565 | 0.565 | 0.540 | 0.540 | 0.565 |
| | vd11 | | | 40.8 | 40.8 | 40.4 | 40.4 | 40.8 |
| | θg, F12 | | | 0.659 | 0.659 | 0.671 | 0.671 | 0.659 |
| | vd12 | | | 17.8 | 17.8 | 16.8 | 16.8 | 17.8 |
| (3) | vd11 − vd12 | 15 | 40 | 23.0 | 23.0 | 23.6 | 23.6 | 23.02 |
| (4) | (Nd11 + Nd12)/2 | 1.90 | 2.30 | 2.01 | 2.01 | 2.07 | 2.07 | 2.01 |
| | Nd11 | | | 1.88 | 1.88 | 2.04 | 2.04 | 1.88 |
| | Nd12 | | | 2.14 | 2.14 | 2.10 | 2.10 | 2.14 |
| (5) | | 0.75 | 1 | 0.903414 | 0.895099 | 0.824249 | 0.764442 | 0.902993 |
| (6) | | 0.4 | 0.8 | 0.770235 | 0.745843 | 0.612552 | 0.488227 | 0.730467 |
| (7) | |f1|/f3 | 0.30 | 0.50 | 0.42 | 0.43 | 0.34 | 0.39 | 0.34 |
| (8) | |f1|/f2 | 0.90 | 1.20 | 1.04 | 1.03 | 0.99 | 0.98 | 1.01 |
| (9) | f2/f3 | 0.25 | 0.50 | 0.41 | 0.42 | 0.34 | 0.39 | 0.34 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-279588, filed Dec. 21, 2011, which is hereby incorporated by reference herein in its entirety.

What is claimed is:

1. A zoom lens comprising, in order from an object side to an image side, a first lens unit of a negative refractive power, a second lens unit of a positive refractive power, and a third lens unit of a positive refractive power, an interval between the first lens unit and the second lens unit and an interval between the second lens unit and the third lens unit being configured to change in zooming from a wide angle end to a telephoto end, wherein the first lens unit includes, in order from the object side to the image side, a negative lens, and a positive lens, wherein the following expressions are satisfied:

$$-0.6 < f1/fT < -0.1$$

$$0.020 < (\theta g, F11 - \theta g, F12)/(\nu d11 - \nu d12) < -0.004$$

$$15 < \nu d11 - \nu d12 < 40$$

where $\nu d11$ is an Abbe number of a material of the negative lens, $\theta g, F11$ is a partial dispersion ratio of the material of the negative lens, $\nu d12$ is an Abbe number of a material of the positive lens, $\theta g, F12$ is a partial dispersion ratio of the material of the positive lens, f1 is a focal length of the first lens unit, and fT is a focal length of an entire zoom lens at the telephoto end.

2. The zoom lens according to claim 1, wherein the following conditional expression is satisfied:

$$1.90 < (Nd11 + Nd12)/2 < 2.30$$

where Nd11 denotes a refractive index of the material of the negative lens, and Nd12 denotes a refractive index of the material of the positive lens.

3. The zoom lens according to claim 1, wherein the following conditional expression is satisfied:

$$0.75 < (R11a - R11b)/(R11a + R11b) < 1.00$$

where R11a denotes a radius of curvature of the lens surface of the negative lens on the object side, and R11b denotes a radius of curvature of the lens surface of the negative lens on the image side.

4. The zoom lens according to claim 1, wherein the following conditional expression is satisfied:

$$0.40 < (R11a - R12b)/(R11a + R12b) < 0.80$$

where R11a denotes a radius of curvature of the lens surface of the negative lens on the object side, and R12b denotes a radius of curvature of the lens surface of the positive lens on the image side.

5. The zoom lens according to claim 1, wherein the following conditional expression is satisfied:

$$0.3 < |f1|/f3 < 0.5$$

where f3 denotes a focal length of the third lens unit.

6. The zoom lens according to claim 1, wherein the following conditional expressions are satisfied:

$$0.9 < |f1|/f2 < 1.2$$

$$0.25 < f2/f3 < 0.50$$

where f2 denotes a focal length of the second lens unit, and f3 denotes a focal length of the third lens unit.

7. The zoom lens according to claim 1, wherein the negative lens has a meniscus shape having a convex surface on the object side, and the positive lens has a meniscus shape having a convex surface on the object side.

8. The zoom lens according to claim 1, wherein the second lens unit includes, in order from the object side to the image side, a cemented lens made by joining a positive lens having a convex surface on the object side and a negative lens having a concave surface on the image side, and a positive lens.

9. The zoom lens according to claim 1, wherein the third lens includes a single positive lens.

10. The zoom lens according to claim 1, wherein in zooming from the wide angle end to the telephoto end, the first lens unit moves with a convex locus on the image side, the second lens unit monotonously moves to the object side, and the third lens unit moves to the image side.

11. The zoom lens according to claim 1, further comprising a fourth lens unit of a positive refractive power on the image side of the third lens unit.

12. An image pickup apparatus comprising:
a zoom lens according to claim 1; and
an image sensor configured to receive light of an image formed by the zoom lens.

* * * * *